United States Patent [19]
Kikuchi et al.

[11] Patent Number: 5,588,606
[45] Date of Patent: Dec. 31, 1996

[54] COVER OF TAPE CARTRIDGE AND ASSEMBLY METHOD OF SAME CARTRIDGE

[75] Inventors: Shuichi Kikuchi; Shintaro Higuchi, both of Miyagi, Japan

[73] Assignee: Sony Corporation, Tokyo, Japan

[21] Appl. No.: 594,699

[22] Filed: Jan. 31, 1996

Related U.S. Application Data

[62] Division of Ser. No. 428,517, Apr. 25, 1995.

[30]   Foreign Application Priority Data

Apr. 28, 1994  [JP]  Japan .................................... 6-091672

[51] Int. Cl.$^6$ .......................... G11B 23/04; G11B 23/087
[52] U.S. Cl. ........................... 242/347; 242/342; 360/132
[58] Field of Search ................................... 242/341, 342, 242/347; 360/132

[56]   References Cited

U.S. PATENT DOCUMENTS 5,333,806  8/1994  Stanley et al. ........................... 242/342

Primary Examiner—John Q. Nguyen
Attorney, Agent, or Firm—Jay H. Maioli

[57]   ABSTRACT

A cover of a tape or data cartridge to be used as an external memory for a computer includes a number of temporary fixture pins integral with a main body of the cover. The pins function to temporarily fix the main body to a base plate of the tape cartridge. The pins are arranged to be engageable respectively with engaging sections formed in the base plate. Each pin includes a first engagement portion for causing the main body to be provisionally fixed to the base plate in a state where the main body is in contact with the base plate, and a second engagement portion for causing the main body to be temporarily fixed to the base plate in a .state where the main body is separate from the base plate.

5 Claims, 6 Drawing Sheets

COVER OF TAPE CARTRIDGE AND ASSEMBLY METHOD OF SAME CARTRIDGE

This is a division of application Ser. No. 08/428,517 filed Apr. 25, 1995.

BACKGROUND OF THE INVENTION

1. Field of the Invention

This invention relates to improvements in a cover of a tape cartridge, particularly used as an external memory such as a data cartridge for a computer, and to an assembly method of such a tape cartridge.

2. Description of the Prior Art

A data cartridge as shown in FIG. 9 is known in the art. The data cartridge 101 comprises a base plate 102 made of aluminum alloy and is provided with first and second hub installation shafts 103, 104 which vertically extend from the upper surface of the base plate 102. The base plate 102 is further provided with a drive roller installation shaft 105, first and second corner roller installation shafts 106, 107, a door installation shaft 108, tape guides 109, 110, and the likes which are all extended vertically from the upper surface of the base plate 102.

A hub 111 for supplying a magnetic tape 121 and a hub 112 for taking up the tape 121 are respectively rotatably mounted on the first and second hub installation shafts 103, 104. A drive roller 113 is rotatably mounted on the drive roller installation shaft 105. First and second corner rollers 114, 115 are rotatably mounted respectively around the corner roller installation shafts 106, 107. A drive belt 116 is passed on the drive roller 113 and the first and second corner rollers 114, 115 and is formed generally T-shaped. A door 118 is rotatably mounted on the door installation shaft 108 and biased in a direction to close under the action of a door spring 117. A mirror 119 is installed on the upper surface of the base plate 102. The cover 120 is made of a plastic and installed to the base plate 102 in a manner to cover the hubs 111, 112, the rollers 113, 114, 115 and the likes. The cover 120 is provided with a light protector 122 which is slidable relative to the cover 120.

As shown in FIG. 10, the cover 120 includes a cover main body 131. Temporary fixture pins 132, 132, 132, 132 are provided integrally with the cover main body 131. The cover main body 131 includes a rectangular upper plate 133. First, second, third and fourth side plates 134, 135, 136, 137 are formed integrally with the upper plate 133 and respectively generally along four sides of the rectangle of the upper plate 133, in which each side plate extends vertically from the lower surface of the upper plate 133. The temporary fixture pins 132 are located inside the side plates 134, 135, 136, 137 and extend from the lower surface of the upper plate 133. As shown in FIG. 11, each temporary fixture pin 134, 135, 136, 137 is formed at its tip end part with an engagement section 141 which is integral with a main body section 132A thereof.

The engagement section 141 includes a small diameter shaft section 142, and a large diameter shaft section 143 which is larger in outer diameter than the small diameter shaft section 142. The small diameter shaft section 142 is located between the large diameter shaft section 143 and the main body section 132A. A vertically extending slit 144 is formed throughout the small and large diameter sections 142, 143 in a manner to axially divide the engagement section 141 into two pieces which are separate from each other so that the engagement section 141 can contract in outer diameter.

As shown in FIG. 12, when the engagement section 141 is inserted in the engagement hole 151 formed in the base plate 102, the small diameter shaft section 142 of the engagement section 141 is brought into engagement with the small diameter section 152 of the engagement hole 151, while the large diameter shaft section 143 of the engagement section 141 is brought into engagement with the large diameter section 153 of the engagement hole 151. As a result, the cover 120 is fixed provisionally on the base plate 102 in a state where the tip end faces 134a, 135a, 136a, 137a of the respective side plates 134, 135, 136, 137 of the cover 120 are in contact with the upper surface of the base plate 102.

Under such a state where the cover 120 is provisionally fixed to the base plate 102, small screws 161 are screwed so that the cover 120 is securely fixed to the base plate 102 thus completing the assembly of the data cartridge 101.

The assembly of the above data cartridge 101 is in general carried out in the order of the following steps:

(1) A step of supplying the base plate 102 which is provided with the hub installation shafts 103, 104, the drive roller installation shaft 105, the corner roller installation shafts 106, 107 and the likes.

(2) A step of assembling the mirror 119 to the base plate 102.

(3) A step of applying grease to portions of the base plate 102 with which portions the drive roller 113, the corner rollers 114, 115 and the likes are in contact.

(4) A step of installing the hubs 111, 112, the drive roller 113, and the corner rollers 114, 115 respectively to the hub installation shafts 103, 104, the drive roller installation shaft 105 and the corner roller installation shafts 106, 107, and of causing the drive belt 116 to be passed on the drive roller 113 and the corner rollers 114, 115.

(5) A step of winding the magnetic tape 21 on the hubs 111, 112 which have been assembled onto the base plate 102.

(6) A step of again applying grease to the portions of the base plate 102.

(7) A step of assembling the cover 120 to the base plate 102.

The above step is followed by a step of assembling the door 118 and the door spring 117 to the base plate 102, and a step of assembling the light protector 122 to the base plate 102.

Now, the steps (1) to (4) in the above steps (1) to (7) are carried out within a relatively short period of time; however, the step (5) of winding the magnetic tape 121 requires a relatively long time.

Accordingly, in case of assembling the data cartridge 101 upon continuously carrying out the steps (1) to (7), a long assembly time is unavoidably required owing to the long time is necessary in performing the step (5).

In order to solve the above problems, the following production method of the data cartridge has been developed and proposed: The steps of the above assembly method are divided into a former process including the steps (1) to (4) and a latter process of the steps (5) to (7). In the former process including the steps (1) to (4), many semi-completed (or-assembled) products of the data cartridge have been previously produced. In each semi-completed product, the hubs 111, 112, the drive roller 113, the corner rollers 114, 115, the drive belt 116 and the like are assembled to the base plate 102. These semi-completed products are transferred together with covers 120 to the latter process including the steps (5) to (7) at which operations such as winding the magnetic tape 121 are perform.

Now, in the above production method, each cover 120 is located by the base plate 102 of the semi-completed product provided with the hubs 111, 112, the drive roller 113 and the like, as a pair, and then transferred to the latter process including the steps (5) to (7). This causes the following problems to arise:

(a) Transferring is made in a state where the cover 120 is located by the base plate 102, and therefore a relatively large space is required.

(b) Dust and the like adhere to the hubs 111, 112, the drive roller 113, the drive belt 116 and the like on the base plate 102.

The above problems (a) and (b) can be solved as follows: The cover 120 is temporarily fixed to the base plate 102 with the temporary fixture pins 132 upon putting the cover 120 on the base plate 102. Thus, transferring is made in a state where the base plate 102 is covered with the cover 120. Then, the cover 120 is removed immediately before the latter process including the steps (5) to (7).

However, as shown in FIG. 12, the tip end faces 134a, 135a, 136a, 137a of the side plates 134, 135, 136, 137 of the cover 120 are brought into contact with the upper surface of the base plate 102 when the cover 120 is temporarily fixed to the base plate 102. This causes the following new problems to arise:

(c) There is the possibility of the grease applied onto the base plate 102 at the grease applying step (3) being adhered to the tip end faces 134a, 135a, 136a, 137a of the side plates 134, 135, 136, 137 of the cover 102 which has been temporarily fixed onto the base plate 102.

(d) When the cover 120 is again assembled to the base plate 102 after the magnetic tape 121 is wound on the hubs 111, 112 upon removing the cover 120 from the base plate 102, the grease adhered to the tip end faces 134a, 135a, 136a, 137a of the side plates 134, 135, 136, 137 of the cover 120 is in turn adhered to the magnetic tape 121 or the like thereby providing a source of trouble.

SUMMARY OF THE INVENTION

It is an object of the present invention is to provide an improved cover of a tape cartridge and method of assembling the tape cartridge, by which drawbacks encountered in conventional covers of tape cartridges and methods of assembling tape cartridges can be effectively overcome.

Another object of the present invention is to provide an improved cover of a tape cartridge and method of assembling the tape cartridge, by which foreign matters such as grease and dust can be prevented from being adhered to a magnetic tape and a drive mechanism for the tape during the assembly operation of the tape cartridge.

A further object of the present invention is to provide an improved cover of a tape cartridge and method of assembling the tape cartridge, by which the cover can be temporarily fixed to a base plate of the tape cartridge in a state where the cover is separate from the base plate during the assembly operation of the tape cartridge.

An aspect of the present invention resides in a cover of a tape cartridge which comprises a main body. At least one pin is provided to temporarily fix the main body to a base plate of the tape cartridge. The pin is integral with the main body and arranged to be engageable with an engaging section formed in the base plate. The pin includes a first engagement portion for causing the main body to be provisionally fixed to the base plate in a state where the main body is in contact with the base plate, and a second engagement portion for causing the main body to be temporarily fixed to the base plate in a state where the main body is separate from the base plate.

With this arrangement, by virtue of the fact that the second engagement portion of the pin is engaged with the engaging section of the base plate, the cover is temporarily fixed to the base plate in the state where the cover is separate from the base plate. Accordingly, the temporarily fixed cover and base plate are transferred to a step for winding a magnetic tape, thus effectively preventing grease or the like from being adhered to the magnetic tape or the like.

It is preferable that the second engagement portion of the pin includes a flange portion for preventing the pin from being gotten out of said engaging section in said base plate. Consequently, the flange portion is securely engaged with the engaging section of the base plate thereby effectively preventing the second engagement portion of the pin from being gotten out of the engaging section of the base plate.

It is also preferable that the second engagement portion of said pin has a length smaller than a depth of said engaging section of the base plate. Consequently, when the second engagement portion of the pin is engaged with the engaging section of the base plate, the second engagement portion of the pin is installed within the engaging section of the base plate and therefore prevented from projecting out of the lower surface of the base plate.

Another aspect of the present invention resides in a method of assembling a tape cartridge which method comprises the following steps: applying grease to portions of a base plate with which portions a drive roller and a corner roller are in contact; assembling the drive roller, the corner roller and a hub to the base plate; temporarily fixing a cover to the base plate in a state where a main body of the cover is separate from the base plate, the cover having at least one pin for temporarily fixing the cover to the base plate, the pin extending from the main body of the cover and having a first engagement portion and a second engagement portion which are located at a tip end section of the pin, the first engagement portion being located between the cover main body and the second engagement portion, the step of temporarily fixing including engaging the second engagement portion with an engaging section formed in the base plate; removing the cover from the base plate; winding a tape on the hub; cutting off and removing the second engagement portion of the pin; and provisionally fixing the cover to the base plate, the step of provisionally fixing including engaging the first engagement portion of the pin with the engaging section of the base plate.

With this assembly method, by virtue of the step of cutting off and removing the second engagement portion of the pin, the second engagement portion does not serve as an obstacle when the first engagement portion is to be engaged with the engaging section of the base plate.

BRIEF DESCRIPTION OF THE DRAWINGS

In the drawings, like reference numerals designate like elements and pans throughout all figures, in which.

DESCRIPTION OF THE PREFERRED EMBODIMENTS

Figure 1:
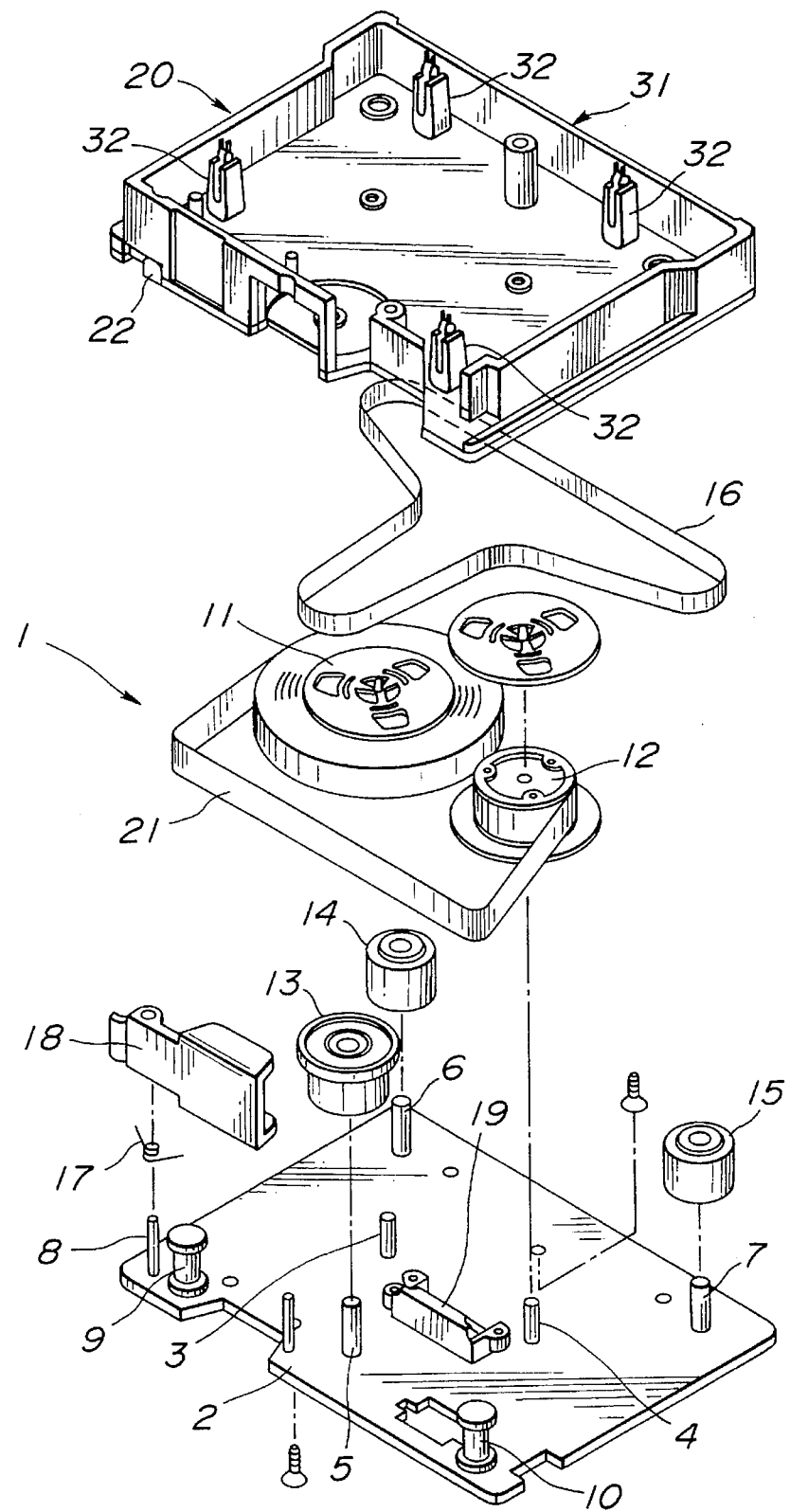
FIG. 1 is an exploded perspective view of a tape or data cartridge using an embodiment of a cover according to the present invention, in which the cover is shown upside down.

Referring now to FIG. 1, an embodiment of a data or tape cartridge according to the present invention is illustrated by the reference numeral 1. The data cartridge 1 is to be used, for example, as an external memory for a computer (not shown). FIG. 1 shows the data cartridge 1 as a perspective view in which a cover 20 is illustrated in a state of being upside down. The data cartridge 1 comprises a base plate 2 made of aluminum alloy, and is provided with first and second hub installation shafts 3, 4 which are vertically extend from the upper surface of the base plate 2. The base plate 2 is further provided with a drive roller installation shaft 5, first and second corner roller installation shafts 6, 7, a door installation shaft 8, tape guides 9, 10, and the likes which are all extended vertically from the upper surface of the base plate 2.

A hub 11 for supplying a magnetic tape 21 and a hub 12 for taking up the tape 21 are respectively rotatably mounted on the first and second hub installation shafts 3, 4. A drive roller 13 is rotatably mounted on the drive roller installation shaft 5. First and second corner rollers 14, 15 are rotatably mounted respectively on the corner roller installation shafts 6, 7. A drive belt 16 is passed on the drive roller 13 and the first and second corner rollers 14, 15 to be formed generally T-shaped. A door 18 is rotatably mounted on the door installation shaft 8 and biased in a direction to close under the action of a door spring 17. A mirror 19 is installed to the upper surface of the base plate 2. The cover 20 is made of a plastic and installed to the base plate 2 in a manner to cover the hubs 11, 12, the rollers 13, 14, 15 and the like. The cover 20 is provided with a light protector 22 which is slidable relative to the cover 20.

Figure 2:
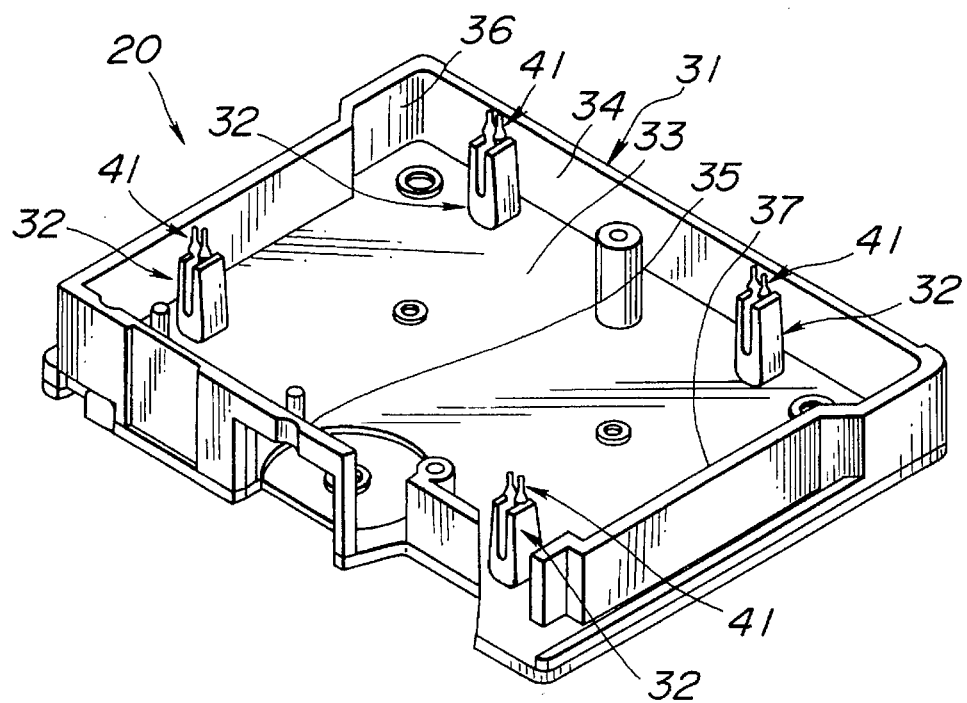
FIG. 2 is a perspective view of the cover of the tape cartridge of FIG. 1.

As shown in FIG. 2, the cover 20 includes a cover main body 31. Temporary fixture pins 32, 32, 32, 32 are formed integrally with the cover main body 31. The cover main body 31 includes a rectangular upper plate 33. First, second, third and fourth side plates 34, 35, 36, 37 are formed integrally with the upper plate 33 and respectively extend generally along four sides of the rectangle of the upper plate 33, in which each side plate extends vertically from the lower surface of the upper plate 33.

Figure 3:
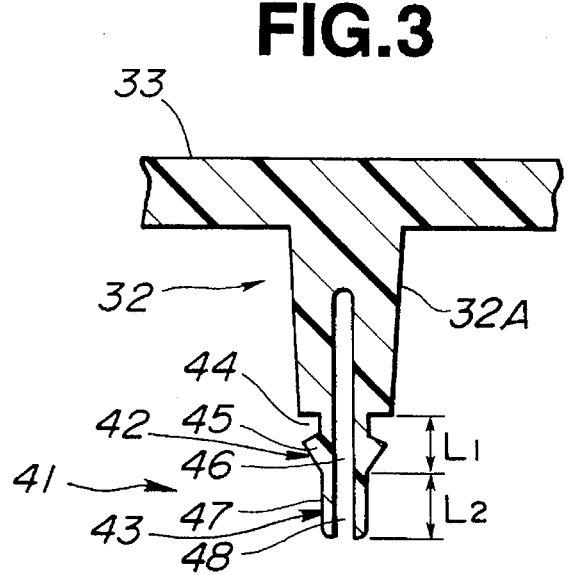
FIG. 3 is a vertical sectional view of an essential part of the cover of FIG. 1.
Figure 4:
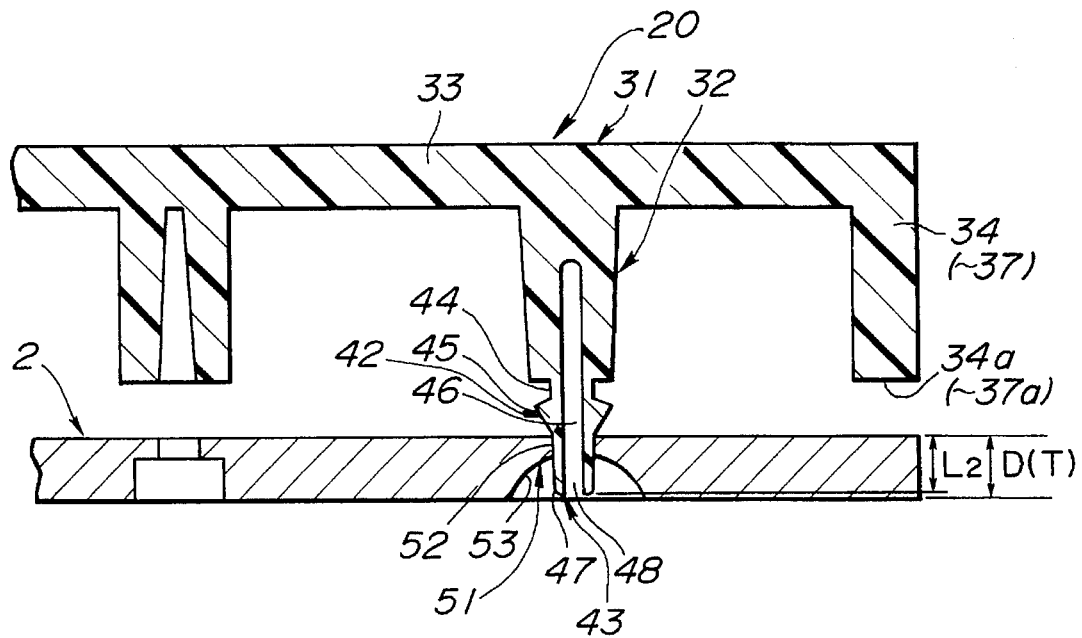
FIG. 4 is a sectional explanatory view of the tape cartridge of FIG. 1, showing a state where the cover is temporarily fixed to a base plate under the action of a second engagement portion of a temporary fixture pin formed in the cover of FIG. 1.

The temporary fixture pins 32 are located inside the side plates 34, 35, 36, 37 and extend from the lower surface of the upper plate 33. As shown in FIG. 3, each temporary fixture pin 34, 35, 36, 37 is formed at its tip end part with an engagement section 41 which is integral with a main body section 32A thereof. The engagement section 41 includes a first engagement portion 42 integral with the main body section 32A. A second engagement portion 43 is formed integral and on the first engagement portion 42. The first engagement portion 42 includes a small diameter shaft section 44, and a large diameter shaft section 45 which is larger in outer diameter than the small diameter shaft section 44. The small diameter shaft section 44 is located between the large diameter shaft section 45 and the main body section 32A. A vertically extending slit 46 is formed throughout the small and large diameter sections 44, 45 in a manner to axially divide the first engagement portion 42 into two pieces, which are separate from each other so that the first engagement portion 42 can contract in outer diameter. The first engagement portion 42 has an axial length L1 which is smaller than the depth D of an engagement hole or engaging section 51 (for the temporary fixture pin 32) of the base plate 2 as shown in FIG. 4. The depth D corresponds to the thickness T of the base plate 2. The engagement hole 51 includes a small diameter section 52, and a large diameter section 53 which is coaxial and continuous with the small diameter section 52. The small diameter section 52 is formed through the upper surface of the base plate 2, while the large diameter section 53 is formed through the lower surface of the base plate 2.

As shown in FIG. 3, the second engagement portion 43 includes a shaft section 47 formed integrally with the tip end of the large diameter shaft section 45. A vertically extending slit 48 is formed to axially divide the second engagement portion 43 into two pieces, which are separate from each other so that the second engagement portion 43 can contract in outer diameter. The shaft section 47 has a diameter which is generally the same as that of the small diameter shaft section 44 of the first engagement portion 42. The slit 48 is continuous with the slit 47 of the first engagement portion 42.

As shown in FIG. 4, when the second engagement portion 43 is inserted into the engagement hole 51 formed in the base plate 2, the second engagement portion 43 enters the engagement hole 51 until the lower end of the large diameter shaft section 45 of the first engagement portion 42 is brought into contact with the upper surface of the base plate 2, so that the cover 20 is temporarily fixed in a state where the tip end face 34a, 35a, 36a, 37a of the respective side plates 34, 35, 36, 37 are separate from the upper surface of the base plate 2.

The second engagement portion 43 has a vertical length L2 which is smaller than the depth D (the base plate thickness T) of the engagement hole 51. Accordingly, when the second engagement portion 43 is inserted in the engagement hole 51 to temporarily fix the cover 20 relative to the base plate 2, the tip end of the second engagement portion 43 is prevented from projecting from the lower surface of the base plate 2.

Figure 5:
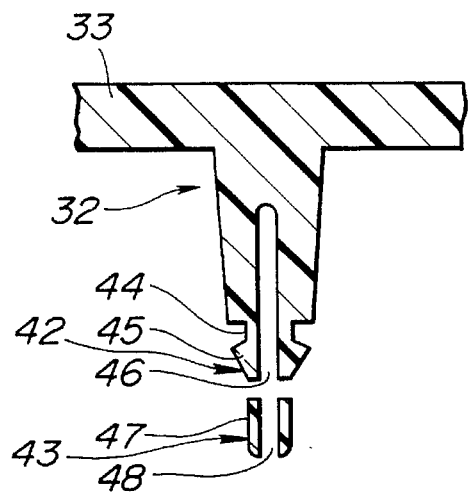
FIG. 5 is a vertically sectional view similar to FIG. 3, showing a state where the second engagement portion of the pin is cut off and removed.
Figure 6:
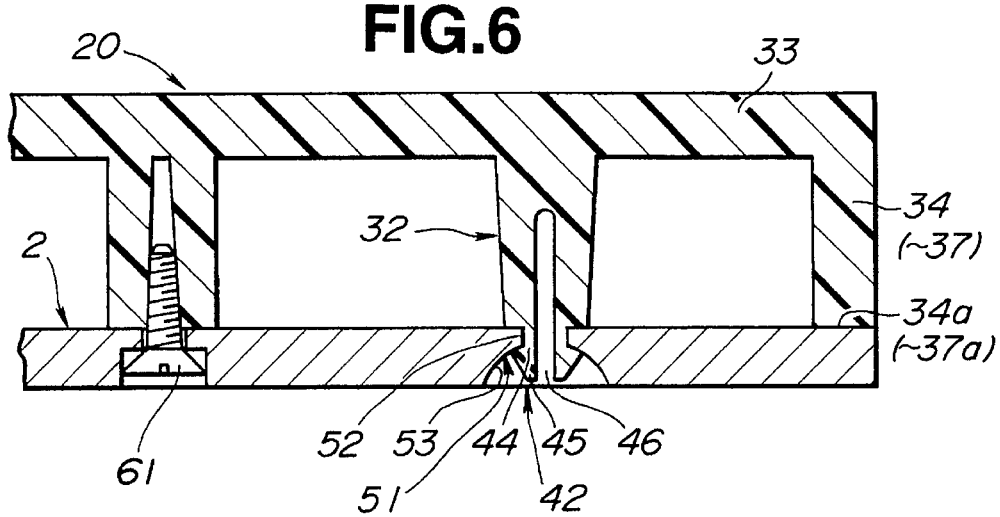
FIG. 6 is a vertical sectional view of an essential part of the tape cartridge of FIG. 1, showing a state where a first engagement portion of the pin is effected to be engaged with the engaging section of the base plate.

As shown in FIGS. 5 and 6, when the second engagement portion 43 is cut out and removed, and the first engagement portion 42 is inserted in the engagement hole 51 formed in the base plate 2, the small diameter shaft section 44 of the first engagement portion 42 is brought into engagement with the small diameter engagement section 52 of the engagement hole 51, while the large diameter shaft section 45 of the first engagement portion 42 is brought into engagement with the large diameter section 53 of the engagement hole 51. As a result, the cover 20 is fixed provisionally on the base plate 2 in a state where the tip end faces 34a, 35a, 36a, 37a of the respective side plates 34, 35, 36, 37 of the cover 20 are in contact with the upper surface of the base plate 2.

The manner of assembly of the above data cartridge will be discussed with advantageous effects along the order of steps carried out in an assembly process.

(1) A step of supplying the base plate 2 which is provided with the hub installation shafts 3, 4, the drive roller installation shaft 5, the corner roller installation shaft 6, 7 and the likes.

(2) A step of assembling the mirror 19 to the base plate 2.

(3) A step of applying grease to portions of the base plate 2 with which portions the drive roller 13, the corner rollers 14, 15 and the likes are in contact.

(4) A step of installing the hubs 11, 12, the drive roller 13, and the corner rollers 14, 15 respectively to the hub installation shafts 3, 4, the drive roller installation shaft 5 and the corner roller installation shafts 6, 7, and of causing the drive belt 16 to be passed on the drive roller 13 and the corner rollers 14, 15.

(5) A step of inserting the second engagement portion 43 of each temporary fixture pins 32 into each engagement hole 51 of the base plate 2, in which the cover 20 is temporarily fixed to the base plate 2 in a state where the tip end faces 34a, 35a, 36a, 37a of the respective side plates 34, 35, 36, 37 are separate from the upper surface of the base plate 2. Accordingly, the grease applied to the base plate 2 at the step (3) is prevented from adhering to the tip end faces 34a, 35a, 36a, 37a of the respective side plates 34, 35, 36, 37.

(6) A step of transferring the base plate 2 to succeeding steps, in the state of FIG. 4 wherein the base plate 2 is covered with the cover 20. Accordingly, dust and the like can be prevented from attaching onto the base plate 2. Additionally, since the base plate 2 and the cover 20 are transferred as an one-piece member upon the temporary fixture therebetween, the transferring can be effectively facilitated providing advantages in space as compared with a case where the base plate and the cover are separately transferred.

(7) A step of removing the cover 20 from the base plate 21 and cutting off the second engagement portion 43 of each temporary fixture pin 32 by a cutter (not shown) or the like.

(8) A step of winding the magnetic tape 21 on the hubs 11, 12 which have been assembled onto the base plate 2.

(9) A step of again applying grease to the portions of the base plate 2.

(10) A step of assembling the cover 20 to the base plate in such a manner that the first engagement portion 42 of each temporary fixture pin 32 of the cover 20 is inserted into the corresponding engagement hole 51 of the base plate 2. As a result, the cover 20 is fixed provisionally onto the base plate 2 in a state wherein the tip end faces 34a, 35a, 36a, 37a of the respective side plates 34, 35, 36, 37 are in contact with the upper surface of the base plate 2. After such a provisional fixture of the cover 20 to the base plate 2, the cover 20 is securely fixed to the base plate 2 by screwing small screws 61 extending from the base plate 2 to the cover 20.

Figure 7:
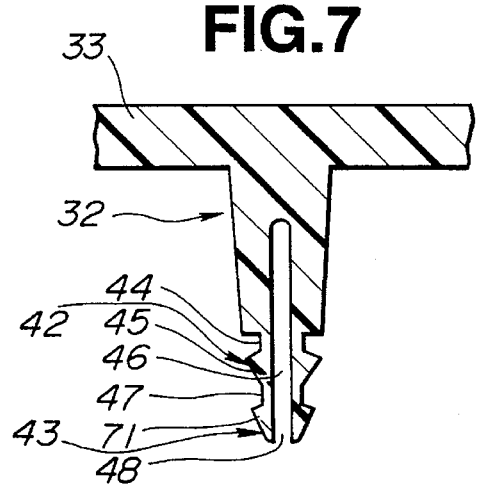
FIG. 7 is a vertical sectional view of an essential part of another embodiment of the cover according to the present invention, forming part of a tape or data cartridge.
Figure 8:
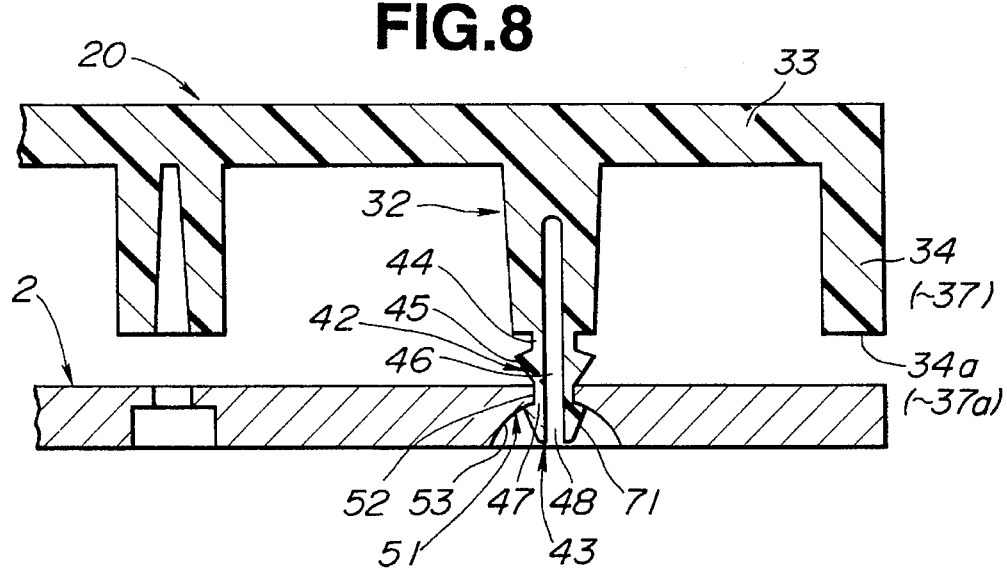
FIG. 8 is a sectional explanatory view of the tape cartridge of FIG. 7, showing a state where the cover is temporarily fixed to a base plate under the action of a second engagement portion of a temporary fixture pin formed in the cover of FIG. 7.
Figure 9:
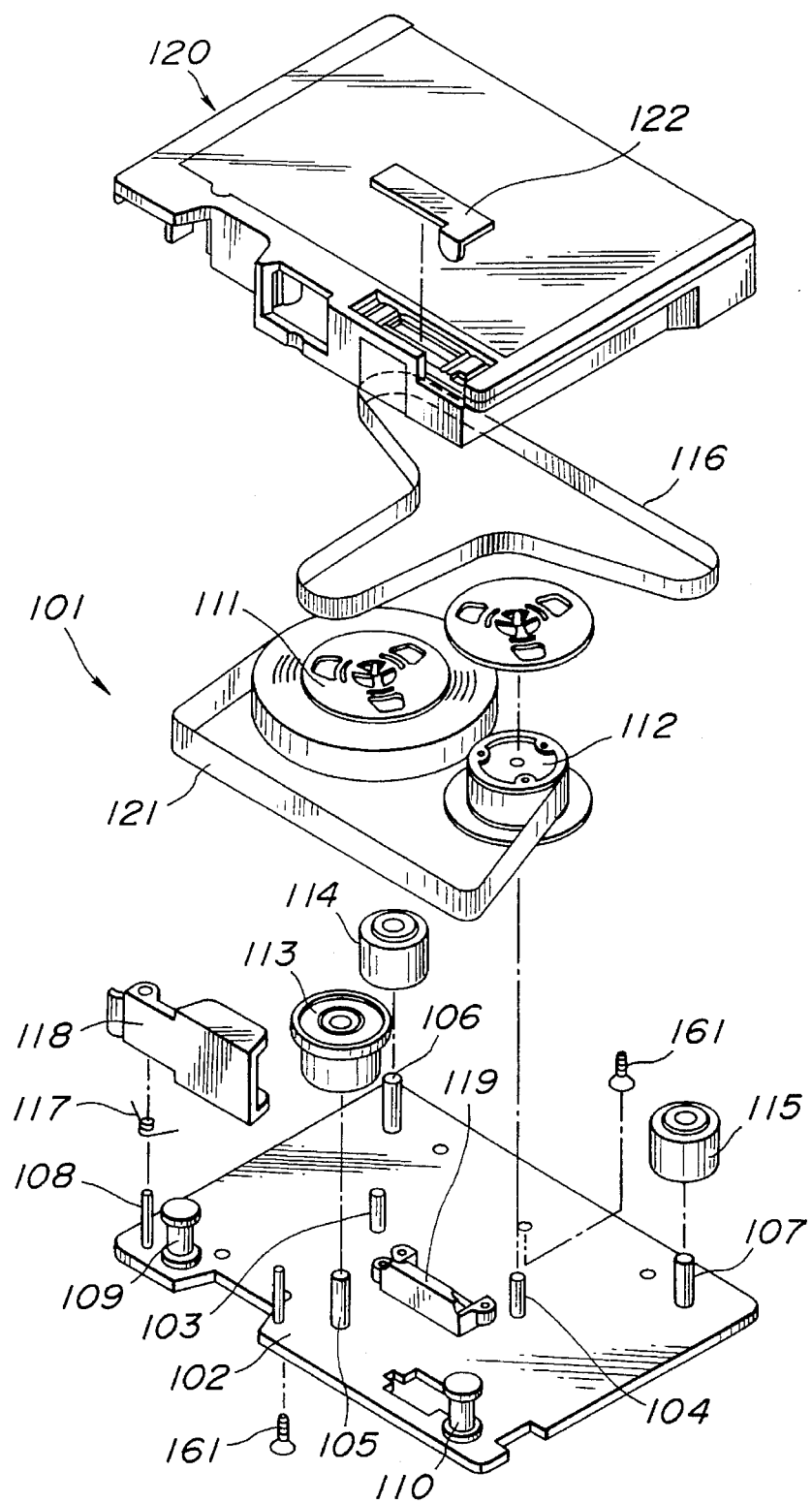
FIG. 9 is an exploded perspective view of a tape or data cartridge using a conventional cover of FIG. 7, in which the cover is shown upside down.
Figure 10:
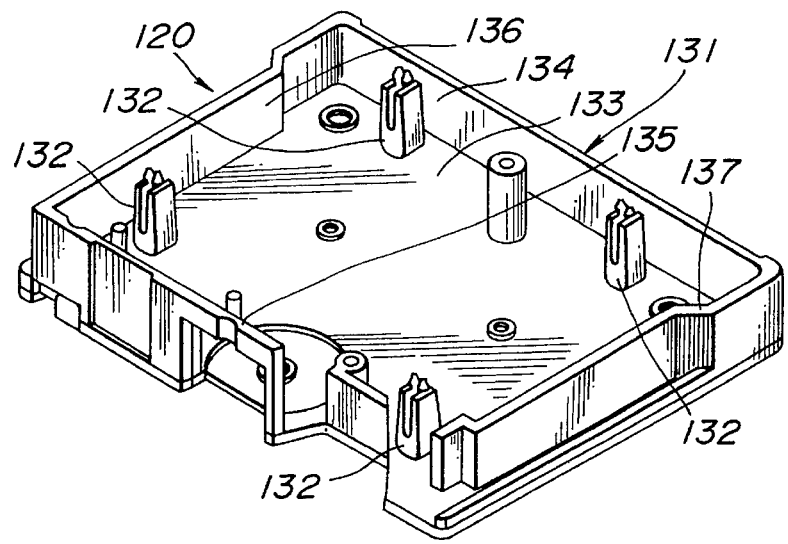
FIG. 10 is a perspective view of the cover of FIG. 9.
Figure 11:
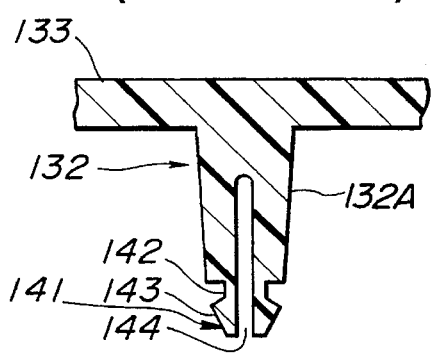
FIG. 11 is a vertical sectional view of an essential part of the cover of FIG. 9.
Figure 12:
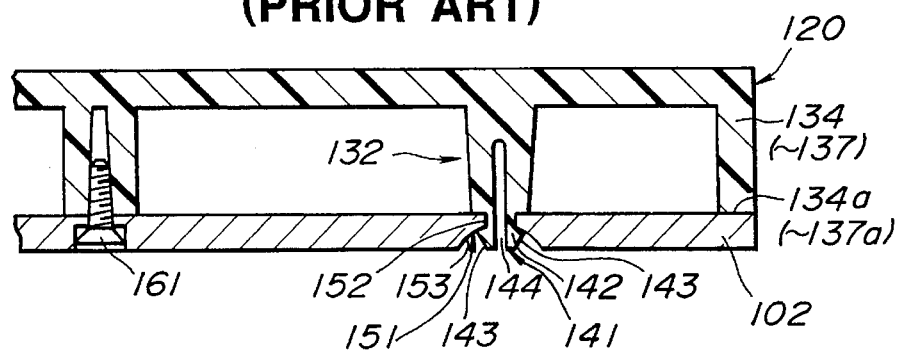
FIG. 12 is a vertical sectional view of an essential part of the tape cartridge of FIG. 9, showing a state where a first engagement portion of the pin is effected to be engaged with the engaging section of the base plate.

FIGS. 7 and 8 illustrate another embodiment of the cover 20 of the data cartridge, according to the present invention, similar to the that of the embodiment of FIGS. 1 to 6. In this embodiment, the second engagement portion 43 of each temporary fixture pin 32 is formed at its tip end part with a flange portion 71 which radially outwardly projects except for the slit 48 as shown in FIG. 7.

When the second engagement portion 43 is inserted into the engagement hole 51 of the base plate 2, the flange portion 71 is engaged with the large diameter section 53 while a portion of the second engagement portion 43 between the flange portion 71 and the large diameter section 45 of the first engagement portion 42 is engaged with the small diameter section 52 of the engagement hole 51. As a result, the second engagement portion 43 of the temporary fixture pin 32 is prevented from being easily removed from the engagement hole 51 of the base plate 2.

While the above discussion has been made only on the data cartridge, it will be understood that the principle of the present invention may be applied to a variety of tape cartridges other than the data cartridge.

What is claimed is:

1. A method of assembling a tape cartridge, comprising the following steps:

applying grease to portions of a base plate with which portions a drive roller and a corner roller are respectively in contact;

assembling the drive roller, the corner roller and a hub to the base plate;

temporarily fixing a cover to the base plate in a state where a main body of the cover is separated from the base plate, the cover having at least one pin for temporarily fixing the cover to the base plate, the pin extending from the main body of the cover and having a first engagement portion and a second engagement portion which are located at a tip end section of the pin, the first engagement portion being located between the cover main body and the second engagement portion, wherein said temporarily fixing includes engaging the second engagement portion with an engaging section formed in the base plate;

removing the cover from the base plate;

winding a tape on the hub;

cutting off and removing the second engagement portion of the pin; and provisionally fixing the cover to the base plate, wherein said provisionally fixing includes engaging the first engagement portion of the pin with the engaging section of the base plate.

2. The method of assembling a tape cartridge as claimed in claim 1, further comprising a step of forming a slit in the tip end section of the pin prior to said step of temporarily fixing.

3. The method according to claim 1, further comprising a step of securely fixing the cover to the base plate by at least one screw following said step of provisionally fixing.

4. The method according to claim 1, further comprising a step of forming a flange at the tip end section of the pin prior to said step of temporarily fixing.

5. The method according to claim 1, further comprising a step of forming the pin integrally with the cover using a plastic material.

\* \* \* \* \*